United States Patent [19]

Weaver

[11] Patent Number: 4,839,122
[45] Date of Patent: Jun. 13, 1989

[54] REACTION INJECTION MOLDING OF WINDOW GASKET

[75] Inventor: William R. Weaver, Toledo, Ohio

[73] Assignee: Libbey-Owens-Ford Co., Toledo, Ohio

[21] Appl. No.: 858,338

[22] Filed: May 1, 1986

Related U.S. Application Data

[62] Division of Ser. No. 535,870, Sep. 26, 1983.

[51] Int. Cl.⁴ ............................................. B29C 45/14
[52] U.S. Cl. .................... 264/129; 264/40.1; 264/40.4; 264/40.5; 264/40.6; 264/135; 264/275; 264/279; 264/328.6; 264/331.19; 425/129.1
[58] Field of Search ............ 264/40.1, 40.4, 40.5, 264/40.6, 46.4, 46.9, 255, 279, 331.19, 275, 135, 129, 328.6; 425/129.1, 256, 543; 156/245

[56] References Cited

U.S. PATENT DOCUMENTS

| 3,263,014 | 7/1966 | Deisenroth . | |
| 3,671,370 | 6/1972 | Littell, Jr. | 264/275 |
| 4,139,234 | 2/1979 | Morgan | 296/84 R |
| 4,249,517 | 2/1981 | Schroeder et al. | 264/46.4 |
| 4,387,923 | 6/1983 | Choby et al. | 296/201 |
| 4,755,339 | 7/1988 | Reilly et al. | 264/252 |

FOREIGN PATENT DOCUMENTS

| 57-158481 | 9/1982 | Japan . |
| 1502735 | 3/1978 | United Kingdom . |

Primary Examiner—Jan H. Silbaugh
Assistant Examiner—Neil M. McCarthy
Attorney, Agent, or Firm—Marshall & Melhorn

[57] ABSTRACT

The preformed assembly of a transparent sheet material and a gasket adhered to the periphery thereof, and the method for producing the assembly. Preferably, the sheet material is glass and the gasket is formed of a thermosetting polyurethane material. The material, curable to produce the gasket, is injected into a mold cavity and thence by controlling the attendant parameters, the autogeneous pressure incident to polymerization causes the material to be urged into intimate contact with mold cavity and the sheet material. After the material has been cured sufficiently, the resultant assembly is removed from the mold cavity.

7 Claims, 4 Drawing Sheets

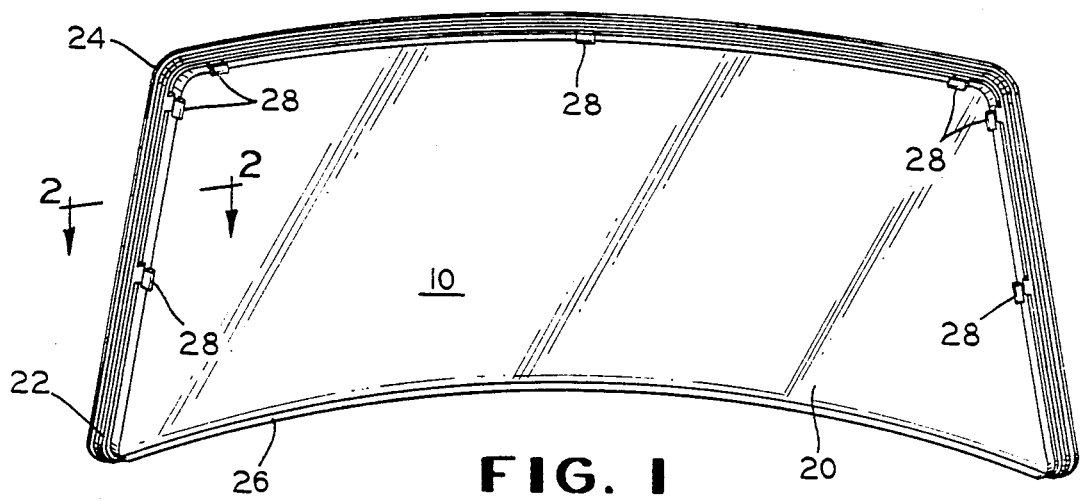
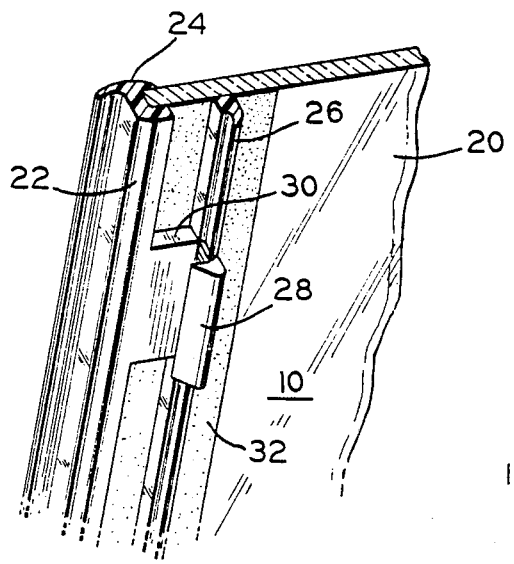
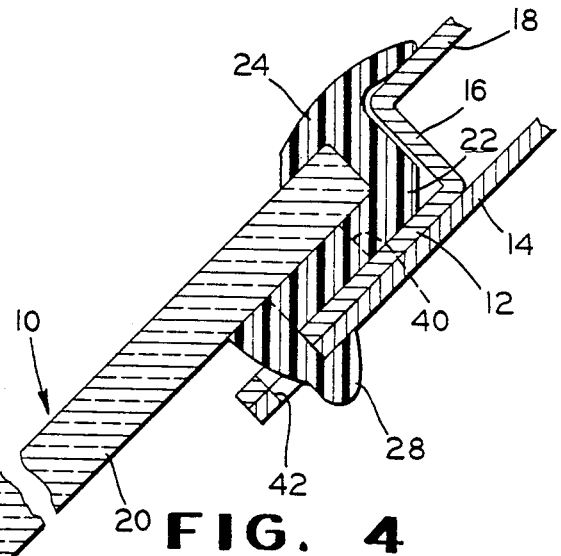
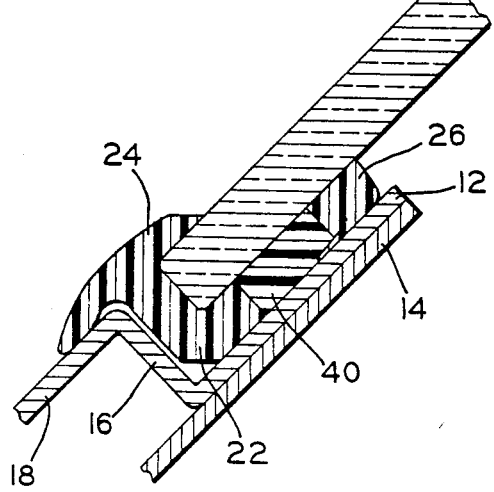
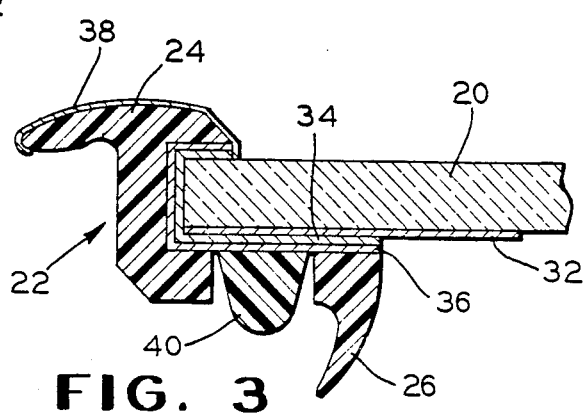

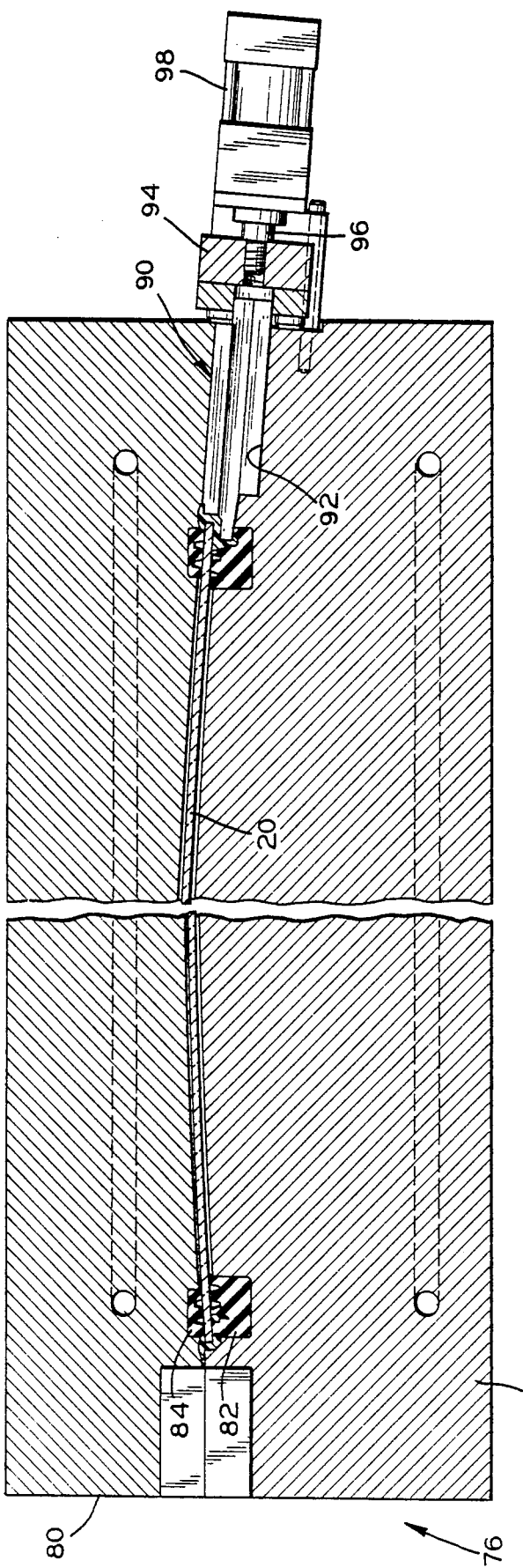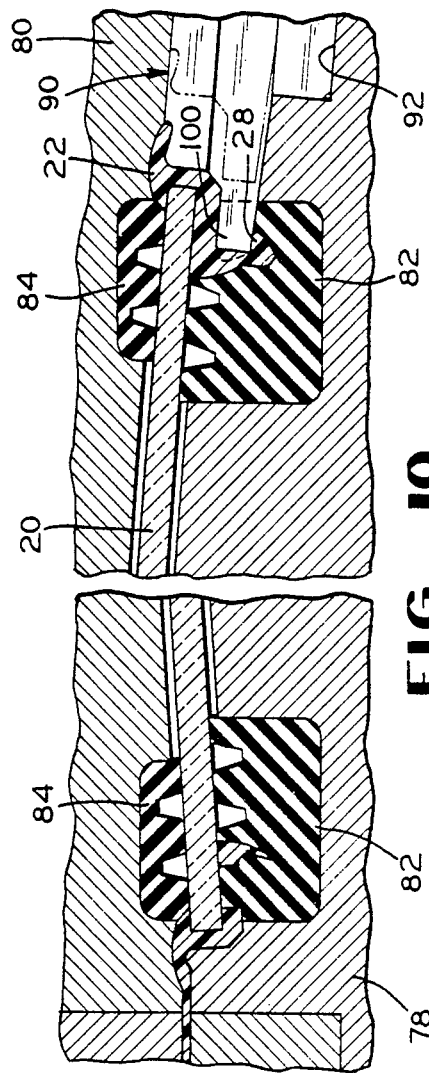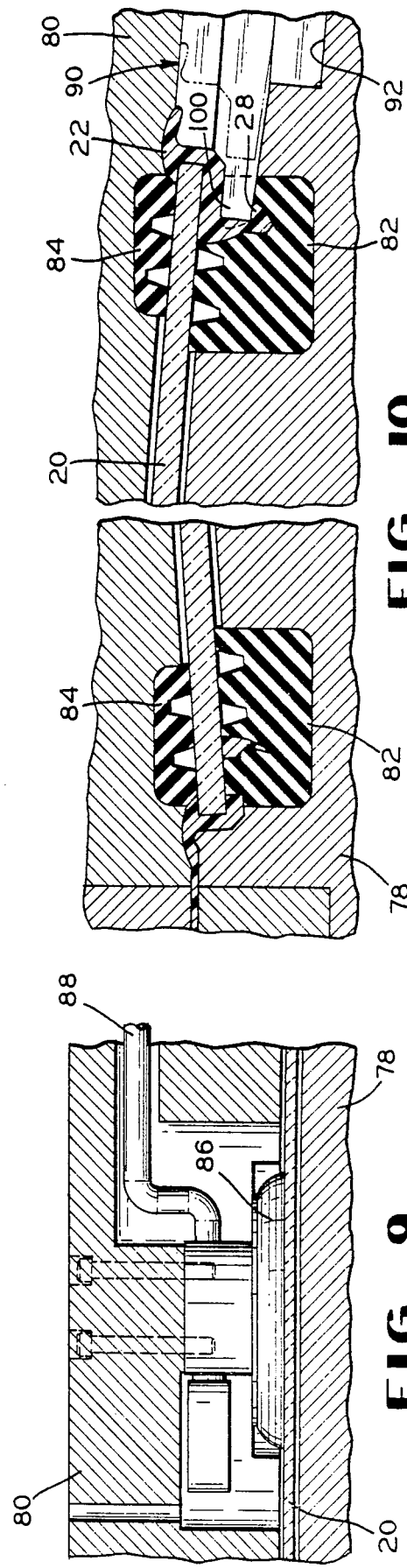

REACTION INJECTION MOLDING OF WINDOW GASKET

This is a division of application Ser. No. 535,870 filed Sept. 26, 1983.

BACKGROUND OF THE INVENTION

The present invention relates to a window assembly and to a process for producing the assembly. More particularly, the invention contemplates a window assembly including a sheet of optically transparent material, such as glass, and a gasket of a polymeric material which is polymerized and cured in situ to encapsulate the marginal peripheral edge portion of the sheet. The gasket is typically formed by a reaction injection molding process. The assembly can be shaped to constitute a vehicle windshield, for example, in which case it can be inserted readily to close a windshield opening surrounded by a frame of appropriate shape to cooperate with the gasket of the assembly.

Initially, windshield assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portion of the vehicle frame.

Clearly, such structures were costly in both material and labor.

Subsequently, in an endeavor to improve the structure, unitary window assemblies of the type illustrated in U.S. Pat. No. 4,072,340 were developed. These assemblies include a sheet of glass, an adjacent frame, and a casing or gasket of molded material, such as polyvinyl chloride, extending between the frame and the peripheral edge of the window to hold the sheet of glass and the frame together. Fasteners are provided at spaced locations along the frame such that the entire assembly can be guided into location over the opening in a vehicle body as a unit with the fasteners extending through aligned apertures in the vehicle body and secured from the interior of the vehicle.

Other window assemblies, such as illustrated in U.S. Pat. No. 4,139,234, include a molded casing or gasket around the edge of the pane of glass with fasteners molded in and projecting from the casing or gasket for purposes of attachment to an associated vehicle body.

The relatively heavy frame members of the above assemblies, typically cast from zinc or other metals or alloys and/or the molded gasket or casing for securing the frame to the window provides significant weight in each window assembly. Also, as illustrated in U.S. Pat. No. 4,072,340, the exterior decorative frame, which requires fastening means along the length thereof to secure the entire assembly in a vehicle, requires expensive casing or gasket techniques rendering the frame members expensive and time-consuming to install.

In an endeavor to reduce the overall weight of a window assembly of the type discussed above and to reduce the costs thereof, other window assemblies have been developed of the general types illustrated in U.S. Pat. Nos. 3,759,004 and 4,364,595. The structure of the former patent includes a glass sheet, with a trim strip surrounding the edge thereof, secured within a suitably framed opening in a vehicle by means of an adhesive pressed between the glass and/or the trim strip and the adjacent portion of the frame around the opening of the vehicle. The trim strip is formed of flexible plastic material with a channel portion which embraces the edge of the glass sheet and a front decorative strip portion which extends from and can hinge relative to the edge of the front wall of the channel portion which lies on the inside of the trim strip when it is fitted around the glass sheet. The trim strip may be maintained in position on the glass sheet by suitable retaining clips of spring metal, for example.

The latter of the above mentioned patents illustrates another window assembly which is installed to close a vehicle opening, for example, as a unit preferably from the outside. The assembly includes a sheet of glass, one of several types of decorative frame or trim members surrounding the glass sheet, and one or more attaching members secured directly to the glass sheet but concealed from view. Preferably, the attaching means are metallic studs rigidly and securely bonded directly to the glass surface with suitable adhesive. The decorative frame member can be injection molded, the patent discloses, around the sheet of glass.

The present invention is a window assembly of comparatively low weight and cost, which can be assembled and installed in a vehicle with minimal handling costs.

SUMMARY OF THE INVENTION

The present invention relates to a window assembly or glazing and to a method of making the same wherein the window material, typically a glass sheet, carries a surrounding synthetic resin mounting member or gasket which encapsulates the marginal periphery of the glass sheet. The mounting member or gasket is applied to the periphery of the glass sheet by injecting into a mold cavity which surrounds the periphery of the glass sheet a composition which is capable of polymerizing and curing therein to produce the gasket; the composition assumes through the autogenous mechanism incident to its polymerization and cure, within the closed mold cavity, intimate contact with the walls which form the mold cavity and with the glass sheet. Excellent results have been achieved by forming the mounting member of a polyurethane composition which cures to a microcellular elastomer.

The process of the instant invention subjects the glass or other transparent sheet material only to low pressures, differing in that respect from processes by which window assemblies having molded plastic frames have heretofore been made, for example by injection molding where a thermoplastic material such as polyvinyl chloride or the like is injected into contact with the surface of the window material at extremely high pressures, typically ranging from 5,000 to 20,000 psi. In many instances, the desired preformed window assemblies include glass sheets having relatively small irregularities formed therein during the manufacturing process. These irregularities are typically caused by the surface of the glass being comprised of zones wherein the normally flat planar configuration is interrupted by a series of small ripples defined by an array of adjacent rapid changes in the surface dimensions. In instances where such glass is used in the injection molding process considerable breakage can be expected. Thus, the high injection pressures required in the injection molding processes require a substantially high pressure (clamp tonnage) to hold the mold surface against the glass surface. Since the steel surfaces of the molds do not conform to the irregularities (and cannot be designed to do so due to the non-repeatable nature of the irregularities), these high pressures often fracture the glass particularly in the zones containing the irregularities.

The preferred resins for use according to the invention are polyurethanes, preferably comprising the linear or slightly branched polypropylene glycol polyethers and diphenyl methane diisocyanates (MDI) which are slightly modified either by carbodimide or by reaction with glycols to provide isocyanate compounds which are liquid at room temperature and low enough in viscosity to satisfy the processing requirements of high pressure metering and mixing equipment.

The resins are formulated to be polymerized when injected into the mold cavity, where the polymerization and curing occur. The reactivity is controlled to provide sufficient polymerization and cell stabilization, a relatively short mold residence time being sufficient for the assembly being produced. In this respect, while room temperature cure is possible the mold surfaces typically are maintained at 140° to 160° F. temperatures which laminated glass products can withstand.

It is an object of the present invention to produce a preformed window assembly including a glass or other transparent sheet and an encapsulating molding of a type of synthetic polymer, such as polyurethane, which polymerizes to adhere in tight sealing relation with the adjacent glass surface enabling the entire preformed assembly to be installed to close a vehicle or other opening with minimal manipulation.

Another object of the invention is to produce a preformed window assembly which can be installed to close an opening and secured without the need for ancillary fasteners and trim strips.

Another object of the invention is to produce a preformed window assembly wherein the exterior portion of an encapsulating synthetic polymer molding is formed with an outer trim portion, adapted to bridge the gap between the exposed glass surface and the portion of the vehicle or the like adjacent the opening to be closed to form a substantially flush mounting.

These objects are achieved by a glazing comprising a transparent sheet material and a microcellular elastomeric polyurethane mounting gasket adhered to the periphery thereof. Preferably, the gasket includes a trim section extending outwardly of the sheet in a plane substantially parallel to the adjacent marginal front surface of the sheet.

The above product can be produced by positioning a transparent sheet material preferably having treated peripheral surfaces within the interior of a mold cavity formed by a plurality of cooperating die sections, said mold cavity having the shape and position, relative to the transparent sheet, of the ultimate gasket, and enclosing the treated surfaces; injecting into the mold cavity a composition which is capable of polymerization to produce for example, a microcellular elastomeric gasket and, when cured in contact therewith, adheres to the treated surfaces of the sheet material; controlling the pressure at which the composition is injected into the mold cavity to one sufficiently low that the sheet material is not damaged; controlling the temperature of the mold cavity, the injection of the composition and the amount of the composition injected so that the composition polymerizes after its injection, is urged by the autogenous pressure incident to polymerization and cure into intimate contact with the die sections and with the sheet material, and cures while in such contact; and removing the assembly from the mold cavity.

BRIEF DESCRIPTION OF THE DRAWINGS

The above objects and advantages of the invention will become readily manifest to those skilled in the art from the following detailed description of a preferred embodiment thereof when considered in the light of the accompanying drawings, in which:

FIG. 1 is a rear elevational view of a preformed window assembly according to the invention;

FIG. 2 is an enlarged fragmentary sectional view of the assembly of FIG. 1 taken along the line 2—2 thereof;

FIG. 3 is an enlarged fragmentary sectional view of the peripheral edge section of the window assembly of FIGS. 1 and 2 showing the application of a bead of adhesive prior to installation of the assembly;

FIG. 4 is a fragmentary vertical sectional view of the window assembly of FIGS. 1, 2 and 3, after it has been installed to close an opening;

FIG. 8 is an enlarged fragmentary sectional view of the mold structure of FIG. 7 taken along the line 8—8 thereof;

FIG. 9 is an enlarged fragmentary sectional view of the vacuum head portion of the mold assembly of FIGS. 7 and 8 taken along the line 9—9 of FIG. 7; and FIG. 10 is an enlarged fragmentary sectional view showing cooperating pad members for supporting a glass article during the production of a window according to the invention by the process of FIG. 5; mold cavities in lower and upper die sections are also shown.

DETAILED DESCRIPTION OF THE PREFERRED EMBODIMENT OF THE INVENTION

Figure 5:
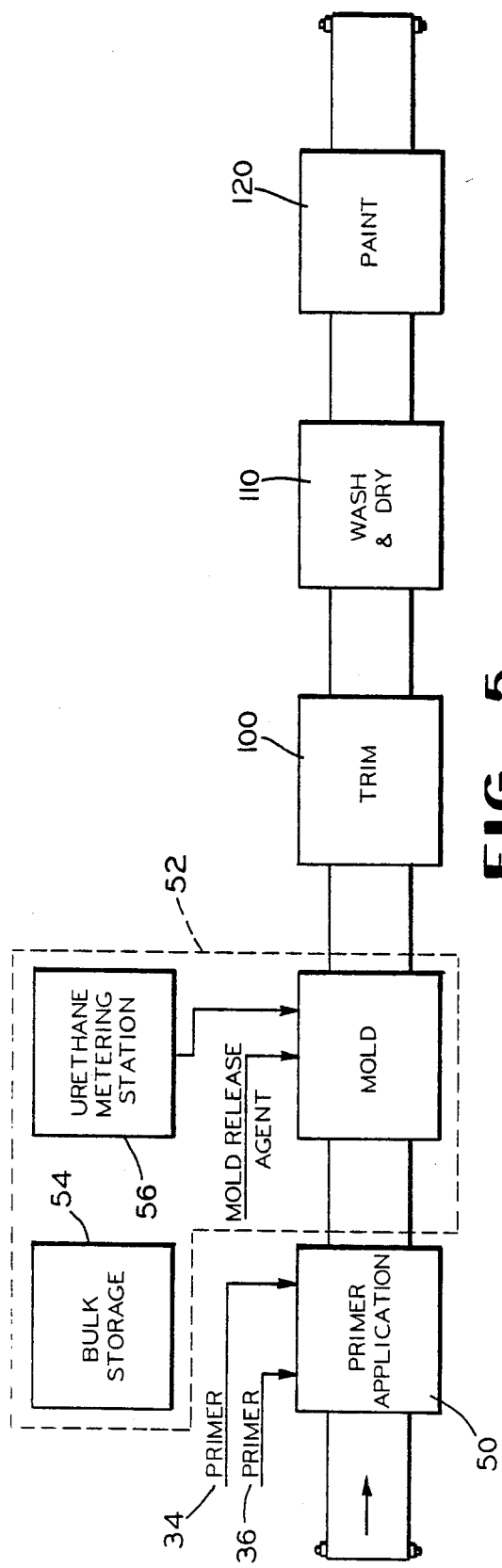
FIG. 5 is a schematic view showing the preferred process for producing the preformed window assembly of FIGS. 1 through 4.
Figure 6:
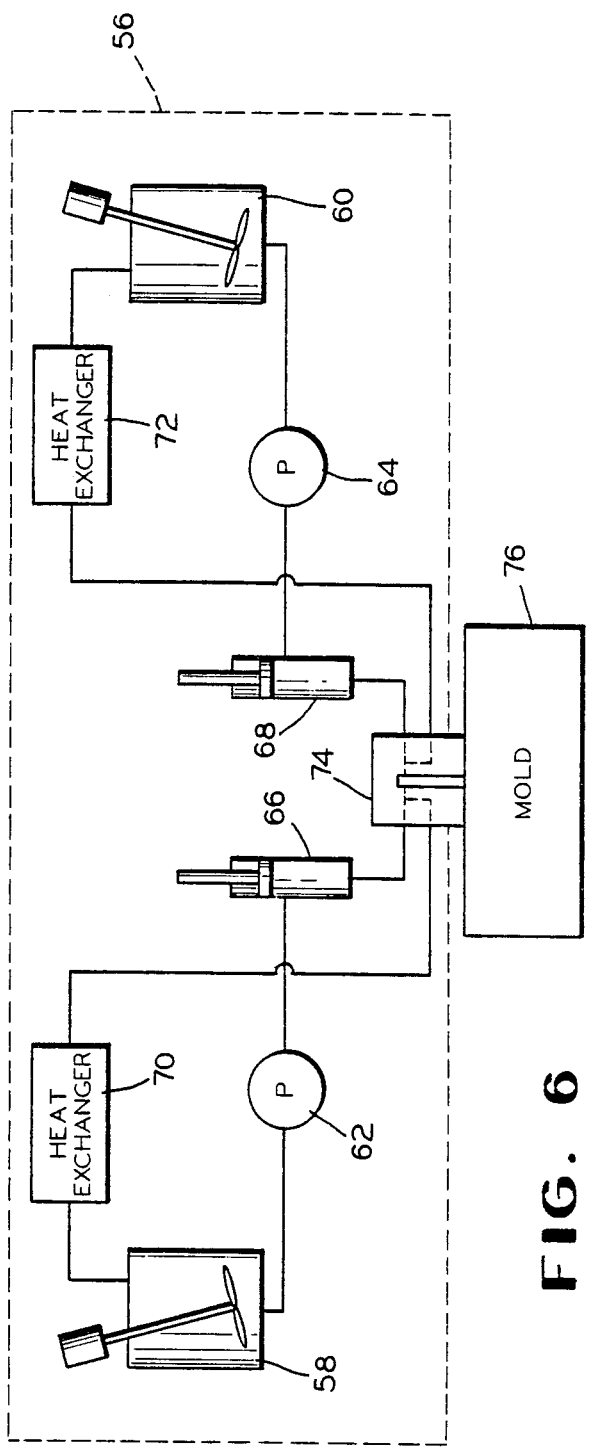
FIG. 6 is a more detailed schematic view showing the basic components which are involved in practicing the process of FIG. 5.

Referring in more detail to the drawings, FIGS. 1, 2, 3 and 4 show a preformed window assembly according to the present invention and produced by the method thereof. More specifically, a preformed backlight 10 for insertion into a suitable opening in a vehicle body is shown. The vehicle body has a back wall portion 12 which generally defines the opening to be closed. The back wall portion 12 is typically formed of a sheet metal stamping and is suitably secured to a strengthening member 14, for example by electric resistance welding. Extending outwardly of the back wall portion 12 and typically integral therewith is a coextensive wall portion 16 which together with the back wall portion 12 defines a cavity which is adapted to receive the preformed window assembly 10. The wall portion 16 terminates in a rather abrupt bend at which point the material 18 is contoured and integral with the sheet metal defining the silhouette of the associated vehicle.

The preformed backlight assembly 10 includes an appropriately shaped window material 20, typically formed of a sheet of optically transparent glass. A synthetic resin mounting member or gasket 22 encapsulates the front, rear, and peripheral edge portions of the window material 20. The outer bead or trim portion 24 of the gasket 22, as best seen in FIG. 4, covers a gap between the peripheral edge of the window material and the metal of the vehicle body which surrounds the opening, as exemplified by the wall portion 16 when the preformed assembly 10 is actually installed on the vehicle.

The portion of the mounting member or gasket 22 which extends inwardly of the trim portion 24 surrounds the peripheral edge and the rear edge of the window sheet material 20 and terminates along the rear surface thereof. There is also a rib or dam member 26 on the rear surface of the window material 20 and spaced inwardly of the termination of the mounting member or gasket 22. The zone between the termination of the gasket 22 and the rib 26 is adapted to confine a bead of suitable adhesive material used in mounting the preformed window assembly. Further, there are tabs 28 integral with the gasket 22 and the rib 26 and bridge member 30 between the gasket 22 and the rib 26 and tabs 28. The tabs 28 are locating and indexing means useful during the mounting of the assembly onto an associated vehicle and to retain the assembly in place until the associated adhesive material cures to effect the desired bond between the preformed assembly and the mating portion of the vehicle.

The first step in producing the backlight 10 involves thorough cleaning of the front, rear and peripheral edges of the glass sheet material 20 to prepare the surfaces for adherence to the mounting gasket 22, the rib 26 and the associated tabs 28. It has been found to be desirable in certain instances to include a layer 32 of opaque paint, glass frit enamel or the like applied to a portion of the rear surface of the sheet 20. The opaque material of the layer 32 is typically employed in instances where it is necessary to conceal, from the exterior, window mounting materials and structures, as well as, for example, windshield wiper drive mechanisms, and in some instances where it is helpful to protect same from ultraviolet radiation.

The next step in producing the backlight 10 is applying a primer coating to the previously cleaned glass surfaces. Satisfactory results have been achieved by initially employing a layer 34 of a product which is commercially available under the designation "Betaseal, Glass Primer 435.18 Commercial Grade," from Essex Chemical Company. The glass bond area is initially wiped with the primer to form the layer 34, which acts as a coupling agent. The primer material is a clear moisture-sensitive primer comprising gamma-aminopropyltriethoxysilane, which promotes adhesion between other Betaseal products and glass.

Following the application of the layer 34, a second primer layer 36 is applied over the layer 34. Satisfactory results were obtained by utilizing a product which is commercially available under the designation "Betaseal, Glass Primer 435.20 Commercial Grade," from Essex Chemical Company. This material is a blackout primer which prevents ultraviolet degradation of urethane sealants and adhesives and assists in the rapid formation of a hydrolytically stable bond between the glass and the urethane. Approximately 20 minutes after the superposed layers 34 and 36 have been applied, the assembly is placed in the die cavity of a mold, where the polyurethane gasket 22, the rib 26, and the tabs 28 are produced; the mold is a part of apparatus subsequently described in detail with reference to FIGS. 5 through 10.

It is often desirable to apply a coating 38 to the outer exposed surface of the trim section of the gasket 22 before the structure is installed in a vehicle. The coating 38 can be a black urethane based paint, such as one manufactured by PPG Industries, Inc., under the designation Purethane 700 HSE-848. The paint coating 33 is then baked at approximately 140°–150° F. for about 20–30 minutes. The coating 38 is applied to protect exposed polyurethane gasket material from degradation which would otherwise be caused by exposure to ultraviolet radiation normally present in unfiltered sunlight.

The preformed window assembly can be installed in an appropriate vehicle opening by applying a bead 40 of adhesive material, for example a urethane sealant such as a sealant manufactured by the Essex Chemical Company designated as Betaseal 551.2, with water paste, to the marginal rear edge surface between the gasket member 22 and the spaced apart rib 26, positioning the assembly in alignment with the vehicle opening, and pushing the assembly into position. When the assembly is aligned with the vehicle opening, the tabs 28 are aligned with spaced cooperating apertures 42 in the back wall portion 12 and the associated strengthening member 14 of the vehicle. The tabs 28 have tapering noses to facilitate alignment. As the assembly is pushed into position, the tapered nose portions of the tabs 28 travel through the apertures 42 and are caused to snap into locked positions where they maintain the adhesive bead 40 in a compressed condition (see FIG. 4). As soon as the adhesive material 40 cures, the installation is complete.

Referring now to FIGS. 5 through 10, the apparatus for producing the assembly 10 includes a primer station 50 and a molding station 52 (see FIG. 5) which comprises a bulk storage area 54 from which a stream which is a blend of polyol, a chain extender, e.g., ethylene glycol, pigment, and a catalyst and a separate stream of an isocyanate are delivered as required to a urethane metering station 56. The isocyanate from the bulk storage tank 54 is delivered to a conditioning tank 58, while the polyol blend is delivered to a tank 60. The outlets of the tanks 58 and 60 communicate with respective displacement cylinders or high pressure metering pumps 66 and 68 through respective recirculation pumps 62 and 64 to keep the material flowing at all times through the supply lines leading to a mixing head 74 and through recirculation lines back to the displacement cylinders 66 and 68. Heat exchangers 70 and 72 are employed in the system to maintain the desired reactant temperatures. Constant motion and temperature control are essential to keep the various insoluble compounds in suspension at temperatures at which the reactants remain inert and liquid, but at which they will react rapidly when brought together.

An injection system is provided to inject a charge composed of closely controlled portions of the two circulating streams into the mold in a smooth even flow. Measured charges of the two streams are delivered to mixing head 74 from the outlets of the displacement cylinders 66 and 68 respectively, by the action of pistons which are represented schematically. The injection into the mixing head 74 is under an applied pressure in the range of approximately 1000 to 3000 psi. The two streams are mixed thoroughly in the mixing head 74. The mixture is delivered therefrom to an associated mold 76 at a pressure of approximately 50 to 100 psi. The mold is typically maintained at a temperature within the range of 140°–150° F.

The mold 76 is comprised of a lower section 78 (FIG. 7) and an upper section 80. Suitable means, not shown, are provided to open and close the mold sections 78 and 80. When the sections are open, the glass sheet 20 is positioned on the lower section 78 so that portions of the rear surface of the glass rest on appropriately positioned pads 82. After the glass section 20 is suitably positioned on the pads 82 of the lower mold section 78, the upper section 80 is lowered into position so that the outer peripheral edges of the cooperating sections 78 and 80 can be clamped together in metal-to-metal contact outwardly of the mold cavity. The upper die section 80 of the mold carries pads 84 which function in cooperation with the pads 82 to press yieldingly against the glass sheet 20 and retain the same within the mold cavity. The cavity of the mold 76 is larger than the formed glass sheet 20 to avoid any glass-to-metal contact.

Figure 7:
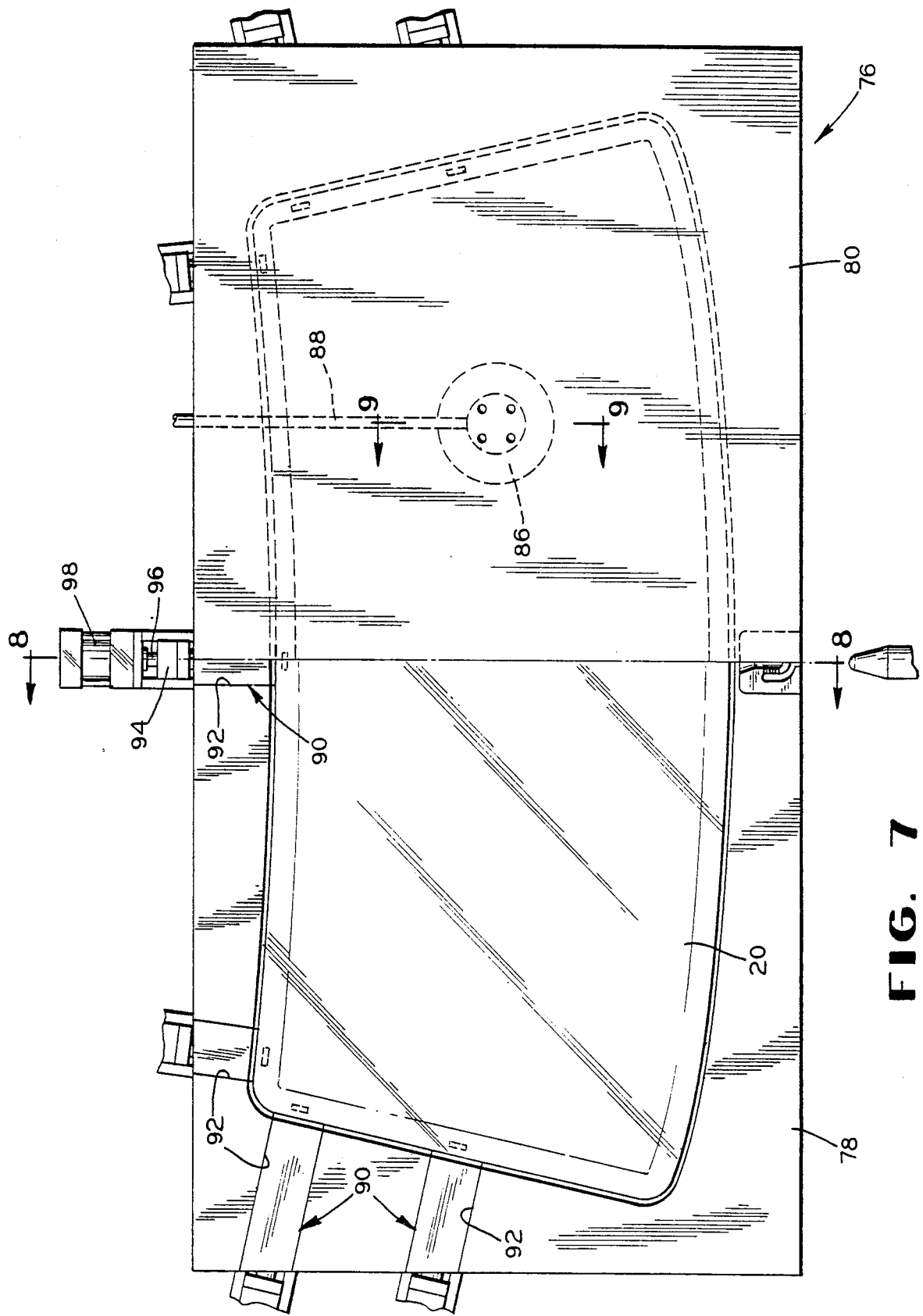
FIG. 7 is a top plan view of a typical mold designed to produce the preformed window assembly of FIGS. 1 through 4.

There are vacuum beads shown in FIGS. 7 and 9 in the upper mold section 80 of the mold 76 to carry the glass upwardly along with the die section 80 when the molding operation has been completed and it is desired to remove the glass sheet 20 from the mold 76. The vacuum head consists primarily of a vacuum cup 86 which communicates with a source of vacuum through a vacuum line 88.

A number of movable mold segments, indicated generally at 90 are provided at spaced points around the circumference of the mold corresponding to the positions of the tabs 28. All of the mold segments are identical and are slidably received in respective recesses 92 provided in the lower mold member 78. The outer end of each segment 90, in respect to the mold, is affixed to a block 94 which is operatively connected to the distal end of a reciprocal piston rod 96 of a conventional fluid operating cylinder 98. The opposite or inner end of each segment 90 terminates in a contour corresponding to the outer profile of gasket 22 and includes extension 100 which provides the undercut in tab 28. In operation, the piston rod 96 is extended, moving the mold segment 90 forwardly (FIGS. 8 and 10) in readiness for receiving the charge of gasket forming resin. Upon polymerization and cure of the gasket material, the piston rod 96 and movable mold segment 90 are retracted, as shown in phantom in FIG. 10, withdrawing extension 100 from the undercut portion of the tab 28, releasing the tab and freeing the backlight assembly for removal from the lower mold member 78 by the vacuum pick-up of upper mold member 80.

After discharge of the assembly from the mold member 78 any excess gasket material or flash is removed at a station 100, the assembly washed and dried at station 110 and the paint coating 38 applied to the outer exposed trim section of the gasket 22 and baked to cure at the station 120.

The following example constitutes the best mode presently contemplated by the inventor. It is to be construed as illustrative, and not as limiting.

EXAMPLE

The surfaces of the upper and lower mold sections 80 and 78 which surround the mold cavity between the two, when assembled, were treated with a solvent-based mold release agent which is a blend of waxes; the particular mold release agent is commercially available from Park Chemical Company under the trade designation PRC-789. A glass sheet 20 was then appropriately positioned on the lower mold 78, after which the upper mold 80 was mated with the lower mold 78, and the two were clamped together. A charge composed of one part by weight of a polyol composition and 0.63 part by weight of an isocyanate was then forced into the mixing head 74 under a pressure of 2,500 psi and from thence into the mold 76 at a pressure of approximately 50 psi. The polyol and isocyanate streams were at a temperature of 110° F., while the mold 76 was at a temperature of 145° F. The polyol and isocyanate streams were thoroughly mixed in the head 74, before they reached the mold 76. Approximately one and one half minutes after the urethane composition was injected therein, the mold 76 was opened, and the assembly 10 was removed therefrom.

The resulting elastomer gasket 22 was microcellular, had a specific gravity of 1.07 g/cc, a hardness (Shore "A") of 90, a tensile strength of 1500 psi, a percent elongation at break of 279 and a flexural modulus (at 75° F.) of approximately 3500 psi.

The polyol composition used in carrying out the procedure described in the foregoing example was composed of 100 pounds of a base polyol, namely a 6000 molecular weight polyether triol with ethylene oxide "capping," sold under the trademark "Voranol" 5815 by the Dow Chemical Company; 10 pounds of ethylene glycol; and 3 pounds of 20% carbon black in polyol.

The isocyanate used in practicing the procedure of the foregoing example was a modified 4,4' diphenyl methane diisocyanate sold under the trademark Rubinate LF 179 by the Rubicon Chemicals Co.

The above constituents were catalyzed by the addition of dibutyl tin dilaurate, and a solution of triethylenediamine in dipropylene glycol.

It will be appreciated that various changes and modifications can be made from the specific details of the instant invention as described above without departing from the spirit and scope thereof as defined in the appended claims. For example, while the preformed window assembly 10 is a backlight structure for an automobile, it must be clearly understood that an assembly according to the invention will function equally well in any fixed glazing application for vehicles such as automobiles, trucks, vans, or buses, as well as in many other applications including architectural, appliance, and boating environments.

The configurations of the trim portion 24 and of the molding 22 lend themselves to the accomplishment of aerodynamic objectives of the automotive industry. An ongoing objective of automotive designers is to create more aerodynamically clean vehicle configurations to increase the vehicle efficiency and thereby reduce the power requirements to enable lower fuel consumption. Since the vehicle backlight and windshield are obvious sources of considerable resistance to smooth air flow, constant attention has been focused on the aerodynamic design improvement of the configuration of the backlight and windshield assemblies and the attendant fastening means and decorative trim.

It will be appreciated, in considering the windshield structures of the type noted in the foregoing Background of the Invention, that the various fastening means and trim have been imperfect from an aerodynamic standpoint and have created undesirable eddy currents adversely affecting the overall efficiency of the vehicle, as well as causing onerous wind noises in the interior of the vehicle during locomotion. The present invention enables a preformed windshield assembly which can be integrated into a flush mounting system wherein the trim portion corresponding with a portion 24 of the mounting member or gasket 22 is substantially flush with the adjacent surfaces thereby very materially improving the aerodynamic characteristics and reducing undesired eddy currents and resultant wind noise.

While the preferred embodiment of the invention utilizes a composition of polyurethane to achieve the desired results, other compositions of nylons, polyesters and epoxies may be suitably utilized.

I claim:

1. A method for producing a window assembly of a sheet of transparent glass and a gasket adhered to treated predetermined portions of the sheet, the gasket having an exposed mounting surface for subsequent contact with an associated framing member and an outer exposed trim section adjacent one surface of the sheet, said method including the steps of:
   (a) treating a predetermined marginal peripheral portion of the sheet of transparent glass with a primer coating which assists in formation of a stable bond between the sheet and the gasket;
   (b) positioning the sheet within the interior of a mold chamber formed by a plurality of cooperating mold sections, said mold sections including a gasket shaping surface which cooperates with the predetermined marginal peripheral portion of the sheet for defining a gasket forming cavity having a shape corresponding to the desired shape of the gasket;
   (c) injecting into the gasket forming cavity a composition which is capable of polymerization and cure to produce a gasket which cures in contact with and adheres to the treated predetermined marginal peripheral portion of the sheet;
   (d) controlling the pressure in the gasket forming cavity into which the composition is injected to one sufficiently low that the sheet is not damaged;
   (e) controlling the temperature of the gasket forming cavity, the injection of the composition, and the amount of the composition injected so that the composition polymerizes after its injection and assumes by the autogenous pressure incident to polymerization intimate contact with the gasket forming cavity and with the treated predetermined marginal peripheral portion of the sheet and cures while in such contact with the treated peripheral portion of the sheet; and,
   (f) removing the assembly from the mold cavity.

2. A method as defined in claim 1, wherein said gasket forming composition includes an isocyanate and a polyol and upon polymerization and cure forms a microcellular polyurethane elastomer.

3. A method as defined in claim 2, wherein said die sections surrounding said mold cavity are maintained at a temperature in the range of approximately 140° F. to 160° F.

4. A method as defined in claim 2, wherein said composition is injected into the mold cavity at a pressure of approximately 50 psi to 100 psi.

5. A method as defined in claim 2, wherein said sheet material is laminated glass.

6. A method as defined in claim 2, wherein said sheet material is tempered glass.

7. A method as defined in claim 2, including the step of applying an ultraviolet absorptive coating on the exposed surface of said gasket after removal thereof from said mold cavity.

* * * * *